(12) United States Patent
Brink et al.

(10) Patent No.: US 8,014,435 B2
(45) Date of Patent: Sep. 6, 2011

(54) SYSTEM AND METHOD USING HIGH PERFORMANCE PREAMBLE COVER SEQUENCES FOR MULTI-BAND OFDM TWO-BAND HOPPING MODES

(75) Inventors: Stephan ten Brink, Irvine, CA (US); Ravishankar H. Mahadevappa, Irvine, CA (US); John Coffey, Irvine, CA (US)

(73) Assignee: Realtek Semiconductor Corp., Hsinchu (TW)

( * ) Notice: Subject to any disclaimer, the term of this patent is extended or adjusted under 35 U.S.C. 154(b) by 721 days.

(21) Appl. No.: 12/110,203

(22) Filed: Apr. 25, 2008

(65) Prior Publication Data

US 2009/0316757 A1 Dec. 24, 2009

Related U.S. Application Data

(60) Provisional application No. 60/914,009, filed on Apr. 25, 2007.

(51) Int. Cl.
*H04B 1/00* (2006.01)

(52) U.S. Cl. .................................... 375/135; 375/130
(58) Field of Classification Search .................. 375/135, 375/130, 295, 343, 267; 370/208, 491
See application file for complete search history.

(56) References Cited

U.S. PATENT DOCUMENTS

| 7,778,370 B2 | 8/2010 | Aytur et al. |
| 2006/0062196 A1* | 3/2006 | Cai et al. ...................... 370/345 |
| 2007/0080849 A1* | 4/2007 | Brandley et al. ................ 342/51 |
| 2008/0118016 A1* | 5/2008 | Chuang et al. ................. 375/359 |
| 2008/0232270 A1* | 9/2008 | Fleming et al. ............... 370/254 |

* cited by examiner

*Primary Examiner* — Khai Tran
(74) *Attorney, Agent, or Firm* — Thomas, Kayden, Horstemeyer & Risley, LLP

(57) ABSTRACT

Methods and systems for packet preamble sequences are provided. The preamble sequences are produce by multiplying preestablished base sequences by cover sequences. The cover sequences are chosen for high-performance in multi-band OFDM systems with modes that include two-band hopping.

32 Claims, 4 Drawing Sheets

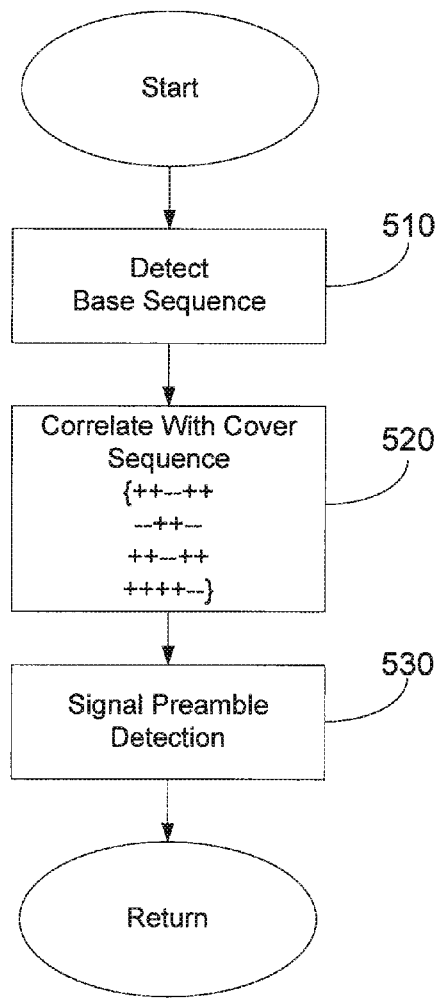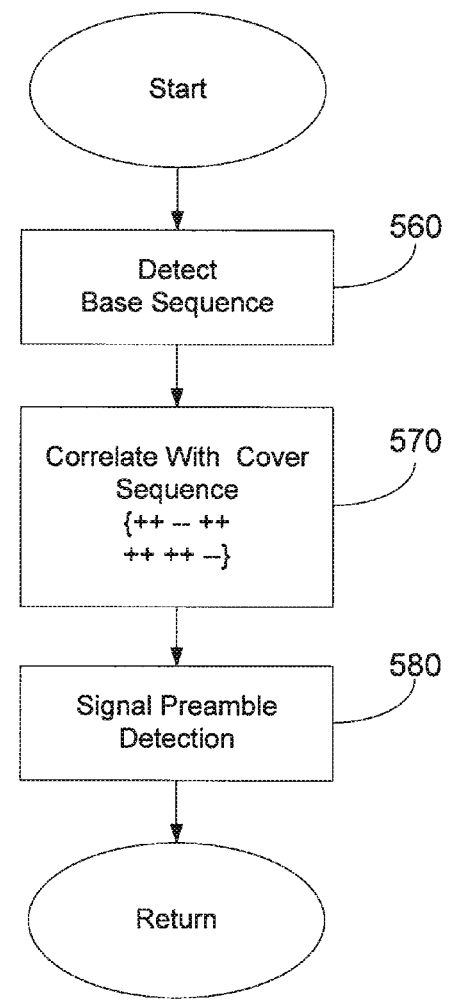

SYSTEM AND METHOD USING HIGH PERFORMANCE PREAMBLE COVER SEQUENCES FOR MULTI-BAND OFDM TWO-BAND HOPPING MODES

CROSS-REFERENCE TO RELATED APPLICATION(S)

This application claims the benefit of the filing date of U.S. Provisional Patent Application No. 60/914,009, filed Apr. 25, 2007, the disclosure of which is incorporated by reference herein.

BACKGROUND OF THE INVENTION

The present invention relates generally to ultrawideband communication systems and more particularly to packet synchronization for ultrawide band communication systems.

Digital communication using an ultrawideband (UWB) system can provide for robust communication. Utilization of a wide band of frequencies may allow high rate communication between devices to occur, often without interfering with other services. Orthogonal frequency division multiplexing (OFDM), which divides a frequency band into multiple smaller frequency bins, may advantageously spread communication over the frequency band of a UWB system. UWB systems may additionally utilize frequency hopping to further spread communication over an available frequency spectrum.

Data communication in a UWB system is often divided into packets. Generally, the beginnings of packets are marked with preamble sequences. Preamble sequences often are useful in that they may allow receivers to determine the presence of a packet and prepare to process data of a packet, among other reasons. For efficient utilization of available data bandwidth, packet preambles generally should be short so that the overhead of their transmission is low. However, reliable detection of packets is also desired, for example to avoid packet loss and subsequent loss of data bandwidth to retransmission. The ability to detect a packet of a given size generally depends on the choice of preamble sequence.

In addition, preferably a preamble sequence provides information allowing a receiver to not only determine that a packet is present, but where data information may be found in a packet. Unfortunately, it may be difficult to determine both that a packet is present and when to begin processing data of a packet based on a preamble sequence.

BRIEF SUMMARY OF THE INVENTION

The present invention provides a UWB communication system and components and methods used by UWB communication systems. In one aspect the invention provides a method for use in forming packet preambles for transmission in an orthogonal frequency division multiplexing (OFDM) ultrawideband (UWB) communication system with frequency hopping, comprising providing a sequence of samples, the sequence of samples providing information for an OFDM symbol; forming a sequence of OFDM symbols, the sequence including at least 12 OFDM symbols, each of the OFDM symbols in the sequence of OFDM symbols including the sequence of samples; effectively multiplying the sequence of samples of the at least 12 OFDM symbols by a cover sequence including at least the sequence 1,1,−1,−1,1, 1,1,1,1,1,−1,−1; appending null samples to the OFDM symbols of the sequence of OFDM symbols; converting the OFDM symbols of the sequence of OFDM symbols to analog signals; upconverting the analog signals; and transmitting the upconverted analog signals.

In another aspect the invention provides a transmitter for a multiband packet communication system, comprising an encoder for encoding a stream of bits pursuant to a forward error correction scheme; an interleaver for interleaving the coded bits; a mapper for mapping the interleaved bits into frequency-domain symbols; a transform block for converting frequency-domain symbols from the mapper to a time-domain representation; a preamble generator for producing packet preambles by multiplying a repeated base sequence by a cover sequence C, wherein C is represented by the sequence {+1 +1 −1 −1 +1 +1 −1 −1 +1 +1 −1 −1 +1 +1 −1 −1 +1 +1 +1 +1 +1 +1 −1 −1} or the sequence {+1 +1 −1 −1 +1 +1 +1 +1 +1 +1 −1 −1}; a guard generator producing null intervals; a filter configured to receive samples from the transform block, the preamble generator, and the guard generator and to modify a characteristic of the samples; a digital-to-analog converter for converting the filtered samples to an analog signal; and an upconverter for modulating the analog signal by a carrier frequency.

In another aspect the invention provides a method of transmitting packet preamble sequences, comprising producing a base sequence; multiplying each of a sequence of repetitions of the base sequence by elements of a cover sequence C to produce a preamble sequence, wherein C is represented by the sequence {+1 +1 −1 −1 +1 +1 −1 −1 +1 +1 −1 −1 +1 +1 −1 −1 +1 +1 +1 +1 +1 +1 −1 −1} or the sequence {+1 +1 −1 −1 +1 +1 +1 +1 +1 +1 −1 −1}; and transmitting the preamble sequence.

In another aspect the invention provides a method of detecting packet preamble sequences for a multiband packet communication system, comprising receiving a plurality of symbols; detecting base sequences in the received symbols; correlating the detected base sequences with a cover sequence C, wherein C is represented by the sequence {+1 +1 −1 −1 +1 +1 −1 −1 +1 +1 −1 −1 +1 +1 −1 −1 +1 +1 +1 +1 +1 +1 −1 −1} or the sequence {+1 +1 −1 −1 +1 +1 +1 +1 +1 +1 −1 −1}; and signaling reception of a preamble sequence if the correlation is sufficient.

In another aspect the invention provides a receiver for a multiband packet communication system, comprising a radio frequency downconverter receiving a radio frequency signal and producing a baseband signal; an analog-to-digital converter for converting the baseband signal to digital samples; and a signal processing block for receiving the digital samples and detecting a preamble sequence, where the preamble sequence comprises a base sequence multiplied by a cover sequence C, wherein C is represented by the sequence {+1 +1 −1 −1 +1 +1 −1 −1 +1 +1 −1 −1 +1 +1 −1 −1 +1 +1 +1 +1 +1 +1 −1 −1} or the sequence {+1 +1 −1 −1 +1 +1 +1 +1 +1 +1 −1 −1}.

These and other aspects of the invention are more fully comprehended upon review of this disclosure.

BRIEF DESCRIPTION OF THE FIGURES

FIG. 5A is a flow diagram of a process for receiving preamble sequences in accordance with aspects of the invention; and FIG. 5B is a flow diagram of a further process for receiving preamble sequences in accordance with aspects of the invention.

DETAILED DESCRIPTION

Figure 1:
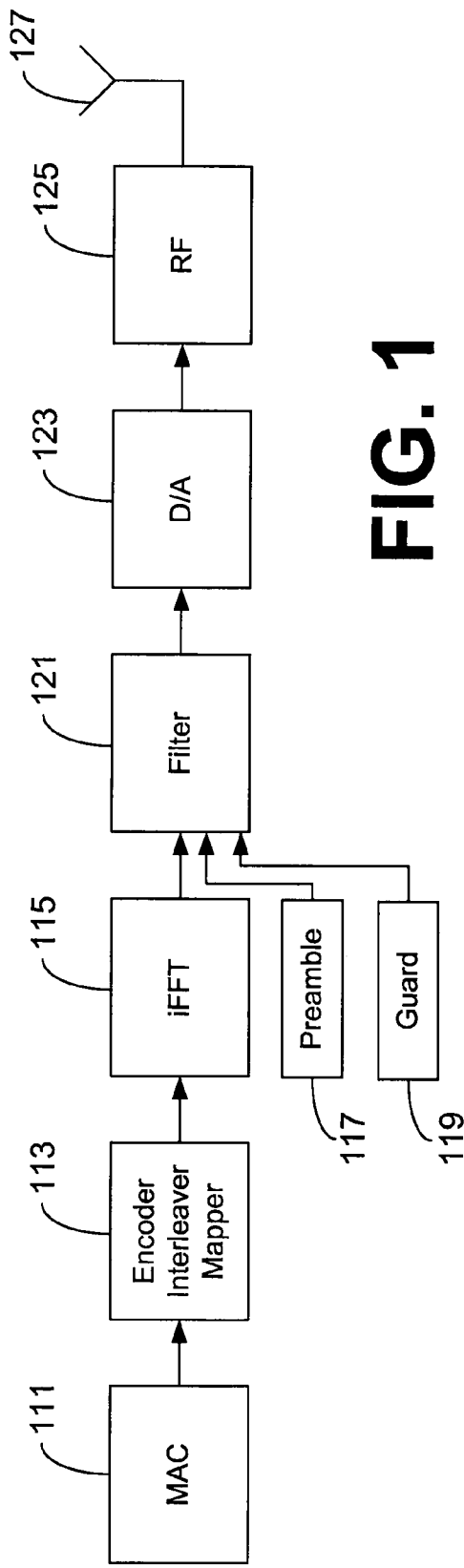
FIG. 1 is a block diagram of a transmitter in accordance with aspects of the invention.

FIG. 1 is a block diagram of a transmitter in accordance with aspects of the invention. The transmitter may be implemented using integrated circuitry, for example as a PHY chip, other chip, or a multiple chip system. The transmitter receives an input bit stream for transmission preferably using frequency division multiplexing. Accordingly, the transmitter codes, interleaves, and maps bits of the input bit stream into frequency-domain symbols, transforms the symbols to time-domain samples, adds preamble symbols, and guard samples, either in the frequency domain or more commonly during time domain processing converts the time-domain samples to an analog representation, upconverts the analog representation to a radio frequency signal, and transmits the radio frequency signal from an antenna. The transmitter may be used in an ultrawideband (UWB) system with orthogonal frequency division multiplexing (OFDM). In most embodiments the transmitter transmits information of different symbols, in varying frequency beds in a time hopping manner.

As shown in FIG. 1, a media access controller (MAC) 111 supplies data and signaling information for transmission. In some embodiments the signaling information may includes an indication of packet preambles. In some embodiments, the media access controller may be implemented in an integrated circuit separate from other portions of the transmitter. More generally, the MAC represents a source of data and signaling information.

Signals from the media access controller carrying the data are received by an encoder/interleaver/mapper block 113. In many embodiments, each of the encoder, the interleaver, and the mapper would be implemented as separate blocks. The encoder may perform convolution coding for forward error correction. The interleaver generally interleaves bits to improve coding robustness, for example, to reduce efforts of bursts of errors. The mapper maps bits into frequency-domain samples using a QPSK scheme, QAM mapping, DCM, or some other constellation scheme.

An inverse Fourier transform (iFFT) block 115 converts a block of frequency-domain samples into a time-domain OFDM symbol. In some embodiments, an inverse fast Fourier transform of length 128 is used. A filter 121 receives the time-domain symbols. The filter shapes frequency characteristics of the signal to meet desired transmission characteristics.

A second source of data for the filter is a preamble block 117. The preamble block, which may be implemented simply using memory, memory and selection circuitry, or other circuitry, produces sequences of time domain samples for transmission during a packet preamble. In most embodiments the time domain samples are for a single OFDM symbol. The packet preamble could, in an alternative embodiment, be inserted into the transmission chain prior to the iFFT block, with the values provided to the iFFT block providing a frequency domain representation of the sequence of time domain samples provided by the preamble block shown in FIG. 1. In most embodiments, a preamble includes multiple OFDM symbols. The preamble values may vary between symbols and with transmitter operating modes. For example, the initial portion of a packet preamble may be a synchronization sequence to signal timing information and a packet boundary. Synchronization sequence symbols may be produced from a repeated base sequence that is modified for each symbol by multiplication by a cover sequence. The cover sequence may be composed of positive and negative ones with the value used based upon the position of symbol in the preamble. Thus, the packet preamble may include a plurality of OFDM symbols, with each OFDM symbol formed of the same sequence of samples, with each of the symbols multiplied, or effectively multiplied, by either 1 or −1.

In some instances, the synchronization sequence of a preamble is either 24 or 12 symbols in length. The corresponding cover sequence, which may be denoted as cover[n] or c(n) or C, is the same length and may be represented by {+1 +1 −1 −1 +1 +1 −1 −1 +1 +1 −1 −1 +1 +1 −1 −1 +1 +1 +1 +1 +1 +1 −1 −1} or {+1 +1 −1 −1 +1 +1 +1 +1 +1 +1 −1 −1}.

The time samples of a synchronization sequence formed from a cover sequence and a base sequence may be defined by the equation $s_n[k]=\text{cover}[n]\times\text{base}[k]$. The symbol position within a preamble is given by n, and k identifies the time point with a symbol. The cover sequence is given by cover[n], and base[k] is the values of the base sequence.

In some embodiments, the preamble block stores a plurality of preamble sequences, with a particular preamble sequence provided for a packet based on signaling information, which may be provided for example by the MAC. An embodiment may multiply a stored base sequence by a stored cover sequence to produce symbols of a packet preamble synchronization sequence. Accordingly, in some embodiments the preamble block includes memory and multiplexer circuits for selection of information from the memory for use, and multiplier circuitry for multiplying the selected information by the cover sequence. In some embodiments, however, multiplication by the cover sequences is not explicitly performed, for example the results of multiplying the base sequence by the cover sequence may be instead stored, or circuitry for effectively multiplying by negative one employed. In other embodiments the MAC may provide the preamble sequence to the preamble block, or in place of the preamble block.

As shown in FIG. 1, a guard block 119 is a third source of data to filter 121. The guard block may provide null postfixing for the OFDM symbols to facilitate separation of symbols at a receiver. In some embodiments, a guard interval is made of 37 zero-valued samples. Guard intervals may be combined with symbols from the iFFT or from the preamble block. A digital-to-analog converter (D/A) 123 receives the output of the filter. The D/A converts digital sample inputs into a continuous-time analog signal. The analog signal is processed by an RF block 125 and then transmitted from an antenna 127. The RF block may include upconversion from baseband frequency to carrier frequency and power amplification. In some embodiments, multiband frequency hopping is used and the carrier frequency may change for each symbol.

Figure 2:
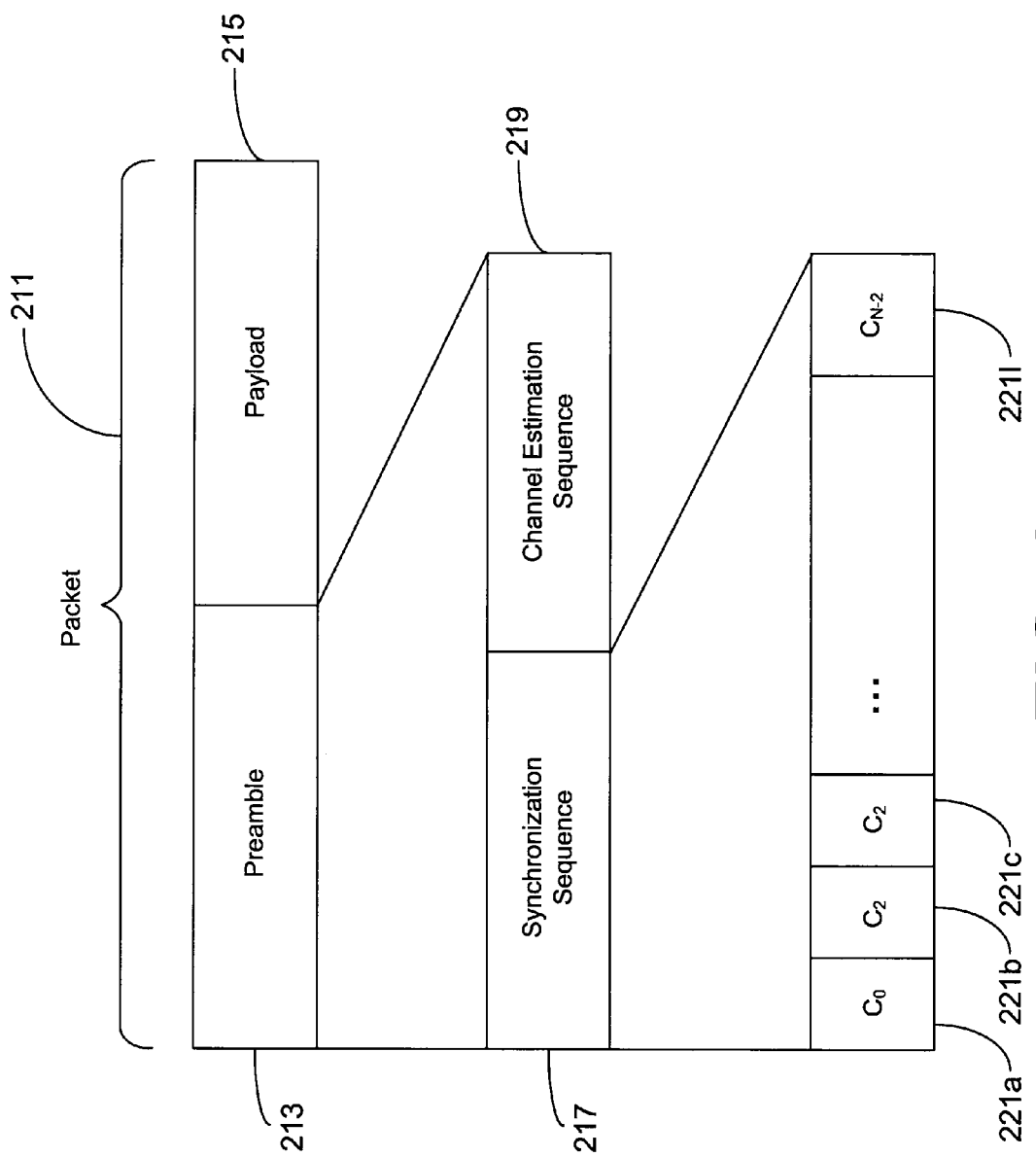
FIG. 2 is a diagram showing packet organization in accordance with aspects of the invention.

FIG. 2 is an illustration of a packet structure used in an ultrawideband communication system in accordance with aspects of the invention. Specifications for example systems that use such a packet structure may be found in WiMedia Multi-band OFDM Physical Layer Specification, Release 1.0; WiMedia Multi-band OFDM Physical Layer Specification, Release 1.1; WiMedia Multi-band OFDM Physical Layer Specification, Draft 1.1.70f; and ECMA Specification EC-368, High Rate Ultra-Wideband PHY and MAC Standard, ISO/IEC 26907, all incorporated herein by reference in their entirety. FIG. 2 shows a packet 211 with a preamble section 213 preceding a payload section 215. The preamble signals the beginning of a packet and facilitates reception of payload data. The preamble includes a synchronization sequence 217 and a channel estimation sequence 219. The synchronization sequence may provide frequency and timing information for a receiver in addition to indicating the start of a packet. A receiver may use the channel estimation sequence to determine characteristics of a communication channel for use in reception of the following payload section. The synchronization sequence of FIG. 2 is divided into a sequence of symbols 221a through 221l. In some embodiments, the symbols are OFDM symbols.

The synchronization sequence includes symbols in a predefined order. The sequence of symbols, including the length of the sequence, may vary with the operating mode of a communication system. In an embodiment, the synchronization sequence symbols are produced by combining a base sequence symbol with a cover sequence. Each symbol of a synchronization sequence is the base sequence symbol multiplied by each successive element from the cover sequence. The base sequence may be defined to facilitate tuning and indicate the frequency bands used. For a given base sequence, a certain cover sequence may provide advantageous characteristics.

The cover sequence may affect the power spectrum transmitted during the preamble. In many instances, it may be desirable to transmit a signal with low variation in power over the frequency band used. Lower variation may allow a system to transmit at a higher power level without exceeding power spectral density limits that may be established, for example, by a local regulatory agency.

The cover sequence used may additionally affect the reliability with which a receiver can detect preambles in the presence of impairments, such as noise and fading. Preamble detection reliability is generally related to the difference between the sequence used and a time-shifted version of that sequence, and this is often called the "distance" of the sequence. In a frequency hopping system, distance at time shifts that are multiples of the hopping interval may have increased value in preamble detection because a receiver may be less likely to be make detection errors across frequency bands.

In some embodiments the cover sequences mentioned above are used by UWB communication systems employing frequency hopping, with successive symbols transmitted over different ones of several frequency bands in a time varying manner. A particular use of frequency bands is often specified by a time frequency code (TFC). In some embodiments, the base sequence is given by the values in column TFC A of Table 1. At symbol time instance 0 value −1.71839 is used, at time instance 1 value −1.86204 is used, and so on. In other embodiments, the base sequence is given by the values in column TFC B or in column TFC C of Table 1. In each case, the defined sequence is a set of real-valued, baseband samples for use before guard interval insertion in a two-band hopping OFDM system.

TABLE 1

| Time | TFC A | TFC B | TFC C |
|---|---|---|---|
| 0 | −1.71839 | −0.709287 | −1.05236 |
| 1 | −1.86204 | 0.196382 | 1.10538 |
| 2 | 0.905757 | 0.717199 | 0.438446 |
| 3 | 0.952625 | 0.167068 | 1.01722 |
| 4 | −0.569144 | 0.491982 | −0.865798 |

TABLE 1-continued

| Time | TFC A | TFC B | TFC C |
|---|---|---|---|
| 5 | 0.315081 | 0.968591 | 0.262427 |
| 6 | −1.00623 | 1.07801 | −0.791569 |
| 7 | −0.106784 | −0.16507 | −0.054426 |
| 8 | −1.87592 | 1.00049 | 0.309661 |
| 9 | −2.22715 | 1.27463 | −1.08607 |
| 10 | 1.82346 | −0.736549 | −1.43226 |
| 11 | 1.44797 | 1.46804 | −0.610819 |
| 12 | −0.480786 | −1.1951 | 0.686699 |
| 13 | 0.76053 | −1.29485 | −1.20534 |
| 14 | −0.83797 | −0.937993 | 0.156026 |
| 15 | 0.355524 | 1.07245 | 1.16424 |
| 16 | −1.48111 | −0.0594181 | 0.825786 |
| 17 | −2.06148 | −0.642928 | −0.484213 |
| 18 | 2.18715 | 0.2139 | −1.75719 |
| 19 | 1.48165 | −0.390915 | −1.43594 |
| 20 | −0.299284 | 1.19964 | 1.61855 |
| 21 | 0.978679 | 0.714976 | −0.66708 |
| 22 | −0.400891 | 1.08996 | 1.45066 |
| 23 | 0.702569 | −0.783955 | 1.18675 |
| 24 | −0.669826 | 1.19365 | −1.18588 |
| 25 | −1.21872 | 1.0296 | 1.4695 |
| 26 | 1.92638 | −0.31873 | 1.24989 |
| 27 | 0.870317 | 1.16921 | 1.47467 |
| 28 | −0.105777 | −0.691849 | −1.00032 |
| 29 | 1.09952 | −1.26207 | 0.429564 |
| 30 | 0.099992 | 0.0672225 | −1.04598 |
| 31 | 0.90075 | 0.412628 | −0.540046 |
| 32 | 1.58888 | 1.53257 | 0.83104 |
| 33 | 0.791583 | 0.527927 | −1.48633 |
| 34 | −0.226165 | −1.11151 | −1.65865 |
| 35 | −0.633607 | 0.898484 | −1.09747 |
| 36 | 1.00617 | −0.958906 | 0.994554 |
| 37 | −0.968076 | −1.75356 | −1.30791 |
| 38 | 0.679786 | −1.37891 | 0.599538 |
| 39 | −0.740637 | 0.781072 | 1.45067 |
| 40 | −0.934377 | −0.490595 | 0.490495 |
| 41 | −0.964758 | −1.23786 | −0.111107 |
| 42 | 1.14598 | 0.684915 | −1.36122 |
| 43 | 0.851765 | −1.23716 | −0.803992 |
| 44 | −0.525444 | 1.73149 | 1.25134 |
| 45 | 1.23998 | 1.36218 | −0.433024 |
| 46 | −0.282715 | 1.62283 | 0.954816 |
| 47 | 1.06474 | −1.26545 | 1.24512 |
| 48 | 1.32106 | 1.0818 | −0.852636 |
| 49 | 1.23835 | 1.36513 | 1.21766 |
| 50 | −0.868245 | −0.371019 | 0.482538 |
| 51 | −0.581004 | 1.49052 | 1.17375 |
| 52 | 0.666909 | −1.22151 | −0.598811 |
| 53 | −0.860936 | −1.44194 | 0.456398 |
| 54 | 0.426511 | −0.201372 | −0.801782 |
| 55 | −0.608375 | 0.843202 | −0.00404091 |
| 56 | −1.0716 | 1.0981 | 0.489696 |
| 57 | −0.608001 | 0.317421 | −0.654527 |
| 58 | 0.664916 | −1.14583 | −1.33046 |
| 59 | 0.759724 | 1.1083 | −0.711104 |
| 60 | −0.703983 | −0.45842 | 0.630054 |
| 61 | 1.18433 | −1.09703 | −0.719436 |
| 62 | −0.346724 | −0.671209 | 0.689404 |
| 63 | 0.986322 | 0.263438 | 1.3098 |
| 64 | 1.40185 | 1.02879 | 0.0158818 |
| 65 | 1.42381 | 0.477165 | −0.0377884 |
| 66 | −1.18387 | −0.967624 | −0.599077 |
| 67 | −0.933055 | 0.351718 | 0.0581158 |
| 68 | 0.734812 | −0.763946 | 0.842178 |
| 69 | −1.15003 | −1.15018 | −0.697387 |
| 70 | 0.45954 | −0.925918 | 0.267622 |
| 71 | −0.968128 | 0.384683 | 0.930121 |
| 72 | −0.769795 | −0.519759 | 0.969326 |
| 73 | −0.723822 | −1.02282 | −0.268894 |
| 74 | 0.347066 | 0.656262 | −1.06847 |
| 75 | 0.493403 | −0.986919 | −1.04895 |
| 76 | −0.337704 | 1.38886 | 1.73742 |
| 77 | 0.310305 | 0.839087 | −0.411099 |
| 78 | −0.310625 | 1.55166 | 1.50059 |
| 79 | 0.216991 | −1.20209 | 0.911803 |
| 80 | −0.522477 | 1.24309 | −0.623132 |
| 81 | −0.471337 | 1.02726 | 1.71823 |
| 82 | 0.653494 | −0.391436 | 1.81244 |

TABLE 1-continued

| Time | TFC A | TFC B | TFC C |
|---|---|---|---|
| 83 | 0.230613 | 1.3033 | 1.30547 |
| 84 | −0.307533 | −0.970741 | −0.487233 |
| 85 | 0.617293 | −1.72141 | 1.31456 |
| 86 | −0.00512736 | −0.0048609 | −0.528538 |
| 87 | 0.485328 | 0.443754 | −1.44612 |
| 88 | 1.52893 | 1.49608 | −0.04695 |
| 89 | 1.11155 | 0.253403 | 0.535663 |
| 90 | −1.09096 | −1.24028 | 1.3825 |
| 91 | −1.14209 | 1.10503 | 0.385821 |
| 92 | 0.852415 | −0.609797 | −1.05424 |
| 93 | −1.41346 | −1.64218 | 1.15793 |
| 94 | 0.405391 | −0.702121 | −0.291517 |
| 95 | −1.24147 | 0.117208 | −1.48776 |
| 96 | −1.12345 | 1.38578 | −0.794131 |
| 97 | −1.19409 | 0.45865 | 0.234134 |
| 98 | 0.544909 | −1.46674 | 1.70675 |
| 99 | 0.80687 | 0.499363 | 1.11299 |
| 100 | −0.506365 | −1.35805 | −1.84603 |
| 101 | 0.420691 | −1.76022 | 0.58196 |
| 102 | −0.677206 | −1.82556 | −1.46888 |
| 103 | 0.328716 | 0.640535 | −1.49085 |
| 104 | −1.45608 | −0.955727 | 0.762578 |
| 105 | −1.07134 | −1.36076 | −1.81441 |
| 106 | 1.20535 | 0.256813 | −1.25443 |
| 107 | 1.05171 | −1.60438 | −1.34163 |
| 108 | −0.89962 | 0.863138 | 0.312235 |
| 109 | 1.44196 | 1.0827 | −1.13518 |
| 110 | −0.410178 | 0.0962362 | 0.461728 |
| 111 | 1.28199 | −0.801902 | 0.834371 |
| 112 | 1.50468 | −1.0242 | −0.105599 |
| 113 | 1.54035 | −0.219133 | −0.488034 |
| 114 | −1.11545 | 0.636153 | −0.847937 |
| 115 | −1.20858 | −0.818528 | −0.223196 |
| 116 | 0.596274 | −0.0661202 | 0.458104 |
| 117 | −0.978615 | 0.732528 | −0.818403 |
| 118 | 0.588076 | −0.0910565 | −0.180805 |
| 119 | −0.847837 | 0.0915937 | 0.782669 |
| 120 | 0.661121 | −1.46747 | 0.44689 |
| 121 | 0.463196 | −0.70736 | −0.329866 |
| 122 | −1.08588 | 0.967963 | −1.59676 |
| 123 | −0.831786 | −0.906606 | −0.991643 |
| 124 | 0.398391 | 0.882624 | 0.937834 |
| 125 | −1.26054 | 1.58948 | −0.424496 |
| 126 | −0.118344 | 0.752414 | 0.765391 |
| 127 | −1.32903 | −0.351434 | 1.0416 |

In one embodiment of the invention, the cover sequence is represented by {+1 +1 −1 −1 +1 +1 −1 −1 +1 +1 −1 −1 +1 +1 −1 −1 +1 +1 +1 +1 +1 +1 −1 −1 −1}. In a second embodiment, the cover sequence is represented by {+1 +1 −1 −1 +1 +1 +1 +1 +1 +1 −1 −1}. These cover sequences may be advantageously used in a multiband system that hops between two frequency bands. In some embodiments a 24 symbol preamble sequence, or long preamble, is used for some communications, along with the 24 element cover sequence, and a 12 symbol preamble sequence, or short preamble, is used for other communications, along with the 12 element cover sequence.

Figure 3:
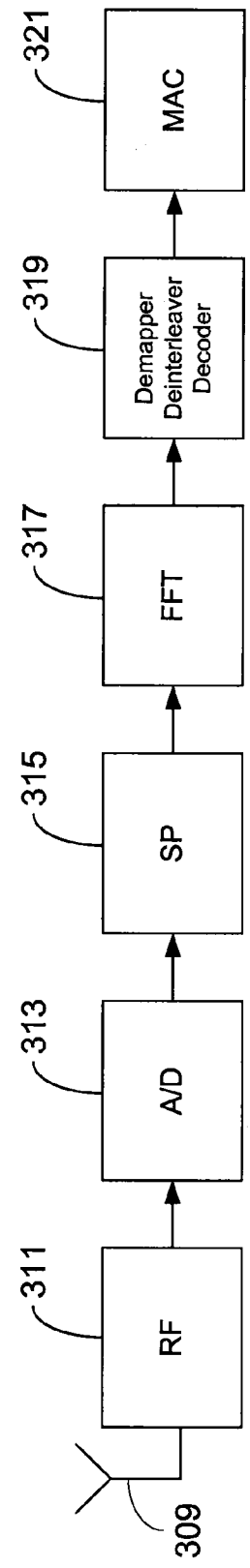
FIG. 3 is a block diagram of a receiver in accordance with aspects of the invention.

FIG. 3 is a block diagram of a receiver in accordance with aspects of the invention. The receiver may be implemented using integrated circuitry, for example as a PHY chip, other chip, or a multiple chip system. Preferably, the receiver receives a signal radiated from a transmitter utilizing frequency division multiplexing. Accordingly, the receiver receives a radio signal from an antenna, downconverts, samples and digitizes into time-domain samples, detects frame and packet signaling, transforms to frequency domain, and then demaps, deinterleaves, and decodes the signal. The receiver may be used in an ultrawideband (UWB) system with orthogonal frequency division multiplexing (OFDM) and multi-band frequency hopping.

As shown in FIG. 3, the receiver includes an antenna 309, which receives a radio signal and converts it into an electrical signal. An RF block 311 receives the electrical signal. The RF block may amplify the signal and downconvert it to a baseband signal. An analog-to-digital converter (A/D) 313 samples and digitizes the baseband signal. In some embodiments, the A/D block may be combined with the RF block in a direct RF sampling scheme. Digitized samples are received by a signal processor 315. The signal processor generally performs packet detection, synchronization, and other related functions. In many embodiments, the signal processor is implemented with circuitry configured to perform these functions, although some embodiments may use a processor configured by program instructions.

Of particular interest in the signal processor is detection of packet preambles. This typically requires examination of the preamble sequence, with particular attention to the cover sequence. Generally, packet synchronization will be determined using auto-correlation, cross-correlation, or, more generally, a combination of both auto-correlation and cross-correlation. In some embodiments, aspects of frame synchronization may be performed such as described in U.S. patent application Ser. No. 11/505,624, filed Aug. 16, 2006, entitled FRAME SYNCHRONIZATION, the disclosure of which is incorporated by reference herein. In one embodiment of the invention, the signal processor detects the cover sequence {+1 +1 −1 −1 +1 +1 −1 −1 +1 +1 −1 −1 +1 +1 −1 −1 +1 +1 +1 +1 +1 +1 −1 −1}. In another embodiment, the signal processor detects the cover sequence {+1 +1 −1 −1 +1 +1 +1 +1 +1 +1 −1 −1}.

As shown in FIG. 3, a Fast Fourier Transform (FFT) block 317 receives digital samples and transforms the information to the frequency domain. A demapper/deinterleaver/decoder block receives the frequency-domain information. In many embodiments, each of the demapper, the deinterleaver, and the decoder would be implemented as separate blocks. The demapper converts frequency domain samples into a bit stream using an algorithm that inverts mapping done in the corresponding transmitter. Likewise, the deinterleaver inverts the interleaving done in the transmitter, and the decoder inverts the coding done in the transmitter. A media access controller (MAC) 321 receives the decoded information. In some embodiments, the media access controller may be implemented in an integrated circuit separate from other portions of the receiver. More generally, the MAC represents a sink of data and signaling information.

Figure 4A:
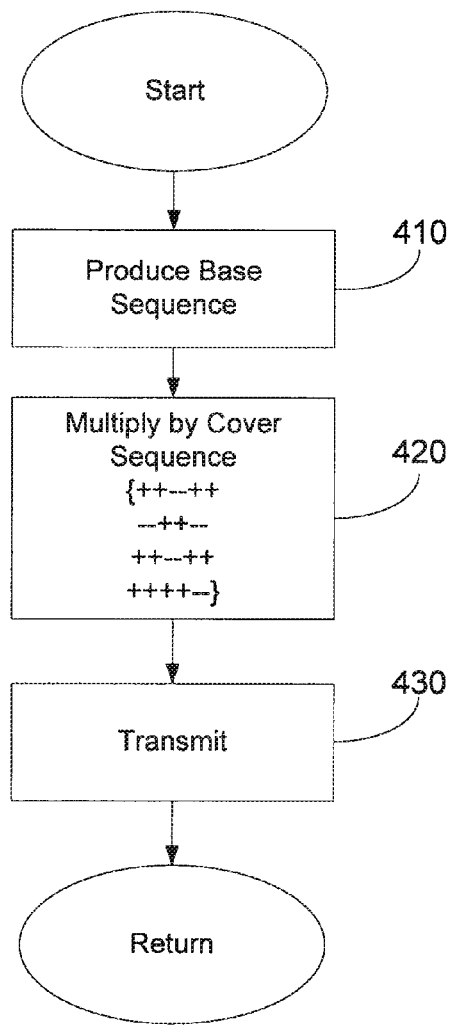
FIG. 4A is a flow diagram of a process for transmission of preamble sequences in accordance with aspects of the invention.

FIG. 4A is a flowchart of a process for transmission of packet preamble synchronization sequences. In some embodiments, the process is performed by a transmitter, for example, the transmitter of FIG. 1. In some embodiments, a PHY, implemented as a standalone chip or in a chip with other components, performs the process. In block 410, the process produces a base sequence. In many embodiments, the base sequence is a set of time-domain samples. The sequence of samples is generally one symbol. In some embodiments, the symbols are OFDM symbols. An embodiment may add a guard interval to the symbols as null or zero value or alternatively as a cyclic prefix. In some embodiments, the base sequence is produced by recalling a sequence from a memory. Other embodiments store a modified version of the sequence and transform it into the desired sequence.

In block 420, the process multiplies, or effectively multiplies, the base sequence by cover sequence {+1 +1 −1 −1 +1 +1 −1 −1 +1 +1 −1 −1 +1 +1 −1 −1 +1 +1 +1 +1 +1 +1 −1 −1 −1} to produce a synchronization sequence. The multiplication, or effective multiplication, combines each element of the cover sequence with repetitions of the base sequence to form the preamble synchronization sequence. In some embodiments, the multiplication is performed by dedicated circuitry. In other embodiments, a programmable processor performs the multiplication under instruction control. In block 430, the process transmits the synchronization sequence. In some embodiments, transmitting includes filtering, digital-to-analog conversion, RF upconversion, and radiation from an antenna, as shown, for example, in the transmitter of FIG. 1. In some embodiments, RF upconversion converts different symbols to different frequency bands. An embodiment may alternate between two frequency bands for each of the symbols. The process thereafter returns.

Figure 4B:
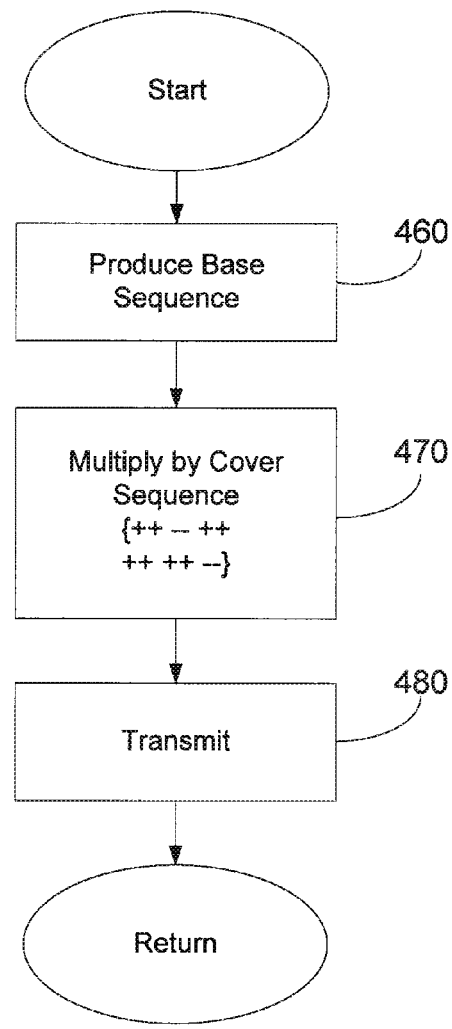
FIG. 4B is a flow diagram of a further process for transmission of preamble sequences in accordance with aspects of the invention.

FIG. 4B is a flowchart of a further process for transmission of packet preamble synchronization sequences. Note that the process is similar to the process shown in FIG. 4A. In block 460, the process produces a base sequence as done in the process shown in FIG. 4A in block 410. In block 470, the process multiplies the base sequence by cover sequence {+1 +1 −1−1 +1 +1 +1 +1 +1 +1 −1 −1} to produce a synchronization sequence. This step of the process is analogous to block 420 of the process shown in FIG. 4A but differs in the cover sequence used. In block 480, the process transmits the synchronization sequence as in block 430 of the process shown in FIG. 4A. The process thereafter returns.

FIG. 5A is a flowchart of a process for reception of packet preamble synchronization sequences. In some embodiments, the process is performed by a receiver, for example, the receiver of FIG. 3. In some embodiments, a PHY, implemented as a standalone chip or in a chip with other components, performs the process. In block 510, the process detects the presence of base sequences. In some embodiments, detection of base sequences is performed by comparing a received sequence of samples to the values expected in a defined base sequence. In other embodiments, detection of base sequences use an autocorrelation method and compares a sequence of received samples to a time delayed version of the same sequence of received samples. Generally, the delay used in computing the correlation will be one or more preamble symbol times. In a multiband system that uses frequency hopping, the delay used will generally match the repetition period of the frequency hopping. In block 520, the process correlates detected based sequences with cover sequence {+1 +1 −1 −1 +1 +1 −1 −1 +1 +1 −1 −1 +1 +1 −1 −1 +1 +1 +1 +1 +1 +1 −1 −1}. In some embodiments, the correlation is performed by correlating directly to the values expected in the cover sequence. In other embodiments, a first-order difference is performed on the detected base sequences, and the first-order difference is correlated with a first-order difference of the cover sequence. In many embodiments, calculation of the correlation uses a window shorter than the length of the cover sequence. In block 530, the process signals preamble detection. In some embodiments, preamble detection is signal based on finding full correlation of received base sequences with the cover sequence. In other embodiments, signaling preamble detection combines soft detection of base sequences and the cover sequence correlation to establish the probability of preamble detection. The process thereafter returns.

FIG. 5B is a flowchart of a further process for reception of packet preamble synchronization sequences. Note that the process is similar to the process shown in FIG. 5A. In block 560, the process detects base sequences as done in the process shown in FIG. 5A in block 510. In block 570, the process correlates detected based sequences with cover sequence {+1 +1−1 −1 +1 +1 +1 +1 +1 +1 −1 −1}. This step of the process is analogous to block 520 of the process shown in FIG. 5A but differs in the cover sequence used. In block 580, the process signals preamble detection as in block 530 of the process shown in FIG. 5A. The process thereafter returns.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

What is claimed is:

1. A method for use in forming packet preambles for transmission in an orthogonal frequency division multiplexing (OFDM) ultrawideband (UWB) communication system with frequency hopping, comprising:
   providing a sequence of samples, the sequence of samples providing information for an OFDM symbol;
   forming a sequence of OFDM symbols, the sequence including at least 12 OFDM symbols, each of the OFDM symbols in the sequence of OFDM symbols including the sequence of samples;
   effectively multiplying the sequence of samples of the at least 12 OFDM symbols by a cover sequence including at least the sequence 1,1,−1,−1,1,1,1,1,1,1,−1,−1;
   appending null samples to the OFDM symbols of the sequence of OFDM symbols;
   converting the OFDM symbols of the sequence of OFDM symbols to analog signals;
   upconverting the analog signals; and
   transmitting the upconverted analog signals.

2. The method of claim 1, wherein effectively multiplying the sequence of samples of the at least 12 OFDM symbols by the cover sequence including at least the sequence 1,1,−1,−1,1,1,1,1,1,1,−1,−1 begins prior to completion of forming the sequence of OFDM symbols, the sequence including at least 12 OFDM symbols, each of the OFDM symbols in the sequence of OFDM symbols including the sequence of samples.

3. The method of claim 1 wherein appending null samples to the OFDM symbols of the sequence of OFDM symbols begins prior to completion of effectively multiplying the sequence of samples of the at least 12 OFDM symbols by the cover sequence including at least the sequence 1,1,−1,−1,1, 1,1,1,1,1,−1,−1.

4. The method of claim 1 wherein the sequence including at least 12 OFDM symbols includes 24 OFDM symbols, and the cover sequence including at least the sequence of 1,1,−1,−1, 1,1,1,1,1,1,−1,−1 comprises the sequence 1,1,−1,−1,1,1,1,−1,− 1,1,1,−1,−1,1,1,1,−1,−1,1,1,1,1,1,1,−1,−1.

5. The method of claim 1 wherein upconverting the analog signals comprises upconverting analog signals of some of the symbols to a first frequency band and upconverting analog signals of others of the symbols to a second frequency band.

6. The method of claim 5 wherein the upconverting analog signals of some of the symbols to the first frequency band and the upconverting analog signals of others of the symbols to the second frequency band alternates for each symbol in the sequence of OFDB symbols.

7. The method of claim 6 wherein the sequence of samples comprises:
   {−1.71839, −1.86204, 0.905757, 0.952625, −0.569144, 0.315081, −1.00623, −0.106784, −1.87592, −2.22715, 1.82346, 1.44797, −0.480786, 0.76053, −0.83797, 0.355524, −1.48111, −2.06148, 2.18715, 1.48165, −0.299284, 0.978679, −0.400891, 0.702569, −0.669826, −1.21872, 1.92638, 0.870317, −0.105777, 1.09952, 0.099992, 0.90075, 1.58888, 0.791583, −0.226165, −0.633607, 1.00617, −0.968076, 0.679786, −0.740637, −0.934377, −0.964758, 1.14598, 0.851765, −0.525444, 1.23998, −0.282715, 1.06474, 1.32106, 1.23835, −0.868245, −0.581004, 0.666909, −0.860936, 0.426511, −0.608375, −1.0716, −0.608001, 0.664916, 0.759724, −0.703983, 1.18433, −0.346724, 0.986322, 1.40185, 1.42381, −1.18387, −0.933055, 0.734812, −1.15003, 0.45954, −0.968128, −0.769795, −0.723822, 0.347066, 0.493403, −0.337704, 0.310305, −0.310625, 0.216991, −0.522477, −0.471337, 0.653494, 0.230613, −0.307533, 0.617293, −0.00512736, 0.485328, 1.52893, 1.11155, −1.09096, −1.14209, 0.852415, −1.41346, 0.405391, −1.24147, −1.12345, −1.19409, 0.544909, 0.80687, −0.506365, 0.420691, −0.677206, 0.328716, −1.45608, −1.07134, 1.20535, 1.05171, −0.89962, 1.44196, −0.410178, 1.28199, 1.50468, 1.54035, −1.11545, −1.20858, 0.596274, −0.978615, 0.588076, −0.847837, 0.661121, 0.463196, −1.08588, −0.831786, 0.398391, −1.26054, −0.118344, −1.32903}.

8. The method of claim 6 wherein the sequence of samples comprises:

{−0.709287, 0.196382, 0.717199, 0.167068, 0.491982, 0.968591, 1.07801, −0.16507, 1.00049, 1.27463, −0.736549, 1.46804, −1.1951, −1.29485, −0.937993, 1.07245, −0.0594181, −0.642928, 0.2139, −0.390915, 1.19964, 0.714976, 1.08996, −0.783955, 1.19365, 1.0296, −0.31873, 1.16921, −0.691849, −1.26207, 0.0672225, 0.412628, 1.53257, 0.527927, −1.11151, 0.898484, −0.958906, −1.75356, −1.37891, 0.781072, −0.490595, −1.23786, 0.684915, −1.23716, 1.73149, 1.36218, 1.62283, −1.26545, 1.0818, 1.36513, −0.371019, 1.49052, −1.22151, −1.44194, −0.201372, 0.843202, 1.0981, 0.317421, −1.14583, 1.1083, −0.45842, −1.09703, −0.671209, 0.263438, 1.02879, 0.477165, −0.967624, 0.351718, −0.763946, −1.15018, −0.925918, 0.384683, −0.519759, −1.02282, 0.656262, −0.986919, 1.38886, 0.839087, 1.55166, −1.20209, 1.24309, 1.02726, −0.391436, 1.3033, −0.970741, −1.72141, −0.0048609, 0.443754, 1.49608, 0.253403, −1.24028, 1.10503, −0.609797, −1.64218, −0.702121, 0.117208, 1.38578, 0.45865, −1.46674, 0.499363, −1.35805, −1.76022, −1.82556, 0.640535, −0.955727, −1.36076, 0.256813, −1.60438, 0.863138, 1.0827, 0.0962362, −0.801902, −1.0242, −0.219133, 0.636153, −0.818528, −0.0661202, 0.732528, −0.0910565, 0.0915937, −1.46747, −0.70736, 0.967963, −0.906606, 0.882624, 1.58948, 0.752414, −0.351434}.

9. The method of claim 6 wherein the sequence of samples comprises:

{−0.05236, 1.10538, 0.438446, 1.01722, −0.865798, 0.262427, −0.791569, −0.054426, 0.309661, −1.08607, −1.43226, −0.610819, 0.686699, −1.20534, 0.156026, 1.16424, 0.825786, −0.484213, −1.75719, −1.43594, 1.61855, −0.66708, 1.45066, 1.18675, −1.18588, 1.4695, 1.24989, 1.47467, −1.00032, 0.429564, −1.04598, −0.540046, 0.83104, −1.48633, −1.65865, −1.09747, 0.994554, −1.30791, 0.599538, 1.45067, 0.490495, −0.111107, −1.36122, −0.803992, 1.25134, −0.433024, 0.954816, 1.24512, −0.852636, 1.21766, 0.482538, 1.17375, −0.598811, 0.456398, −0.801782, −0.00404091, 0.489696, −0.654527, −1.33046, −0.711104, 0.630054, −0.719436, 0.689404, 1.3098, 0.0158818, −0.0377884, −0.599077, 0.0581158, 0.842178, −0.697387, 0.267622, 0.930121, 0.969326, −0.268894, −1.06847, −1.04895, 1.73742, −0.411099, 1.50059, 0.911803, −0.623132, 1.71823, 1.81244, 1.30547, −0.487233, 1.31456, −0.528538, −1.44612, −0.04695, 0.535663, 1.3825, 0.385821, −1.05424, 1.15793, −0.291517, −1.48776, −0.794131, 0.234134, 1.70675, 1.11299, −1.84603, 0.58196, −1.46888, −1.49085, 0.762578, −1.81441, −1.25443, −1.34163, 0.312235, −1.13518, 0.461728, 0.834371, −0.105599, −0.488034, −0.847937, −0.223196, 0.458104, −0.818403, −0.180805, 0.782669, 0.44689, −0.329866, −1.59676, −0.991643, 0.937834, −0.424496, 0.765391, 1.0416}.

10. A transmitter for a multiband packet communication system, comprising:

an encoder for encoding a stream of bits pursuant to a forward error correction scheme;

an interleaver for interleaving the coded bits;

a mapper for mapping the interleaved bits into frequency-domain symbols;

a transform block for converting frequency-domain symbols from the mapper to a time-domain representation;

a preamble generator for producing packet preambles by multiplying a repeated base sequence by a cover sequence C, wherein C is represented by the sequence {+1 +1 −1 −1 +1 +1 −1−1 +1 +1 −1 −1 +1 +1 −1 −1 +1 +1 +1 +1 +1 −1 −1} or the sequence {+1 +1 −1 −1 +1 +1 +1 +1 +1 +1 −1, −1};a guard generator producing null intervals;

a filter configured to receive samples from the transform block, the preamble generator, and the guard generator and to modify a characteristic of the samples;

a digital-to-analog converter for converting the filtered samples to an analog signal; and an upconverter for modulating the analog signal by a carrier frequency.

11. The transmitter for a multiband packet communication system of claim 10, wherein the carrier frequency hops between two frequencies.

12. The transmitter for a multiband packet communication system of claim 10, wherein the base sequence comprises:

{−0.71839, −1.86204, 0.905757, 0.952625, −0.569144, 0.315081, −1.00623, −0.106784, −1.87592, −2.22715, 1.82346, 1.44797, −0.480786, 0.76053, −0.83797, 0.355524, −1.48111, −2.06148, 2.18715, 1.48165, −0.299284, 0.978679, −0.400891, 0.702569, −0.669826, −1.21872, 1.92638, 0.870317, −0.105777, 1.09952, 0.099992, 0.90075, 1.58888, 0.791583, −0.226165, −0.633607, 1.00617, −0.968076, 0.679786, −0.740637, −0.934377, −0.964758, 1.14598, 0.851765, −0.525444, 1.23998, −0.282715, 1.06474, 1.32106, 1.23835, −0.868245, −0.581004, 0.666909, −0.860936, 0.426511, −0.608375, −1.0716, −0.608001, 0.664916, 0.759724, −0.703983, 1.18433, −0.346724, 0.986322, 1.40185, 1.42381, −1.18387, −0.933055, 0.734812, −1.15003, 0.45954, −0.968128, −0.769795, −0.723822, 0.347066, 0.493403, −0.337704, 0.310305, −0.310625, 0.216991, −0.522477, −0.471337, 0.653494, 0.230613, −0.307533, 0.617293, −0.00512736, 0.485328, 1.52893, 1.11155, −1.09096, −1.14209, 0.852415, −1.41346, 0.405391, −1.24147, −1.12345, −1.19409, 0.544909, 0.80687, −0.506365, 0.420691, −0.677206, 0.328716, −1.45608, −1.07134, 1.20535, 1.05171, −0.89962, 1.44196, −0.410178, 1.28199, 1.50468, 1.54035, −1.11545, −1.20858, 0.596274, −0.978615, 0.588076, −0.847837, 0.661121, 0.463196, −1.08588, −0.831786, 0.398391, −1.26054, −0.118344, −1.32903}.

13. The transmitter for a multiband packet communication system of claim 10, wherein the base sequence comprises: {−0.709287, 0.196382, 0.717199, 0.167068, 0.491982, 0.968591, 1.07801, −0.16507, 1.00049, 1.27463, −0.736549, 1.46804, −1.1951, −1.29485, −0.937993, 1.07245, −0.0594181, −0.642928, 0.2139, −0.390915, 1.19964, 0.714976, 1.08996, −0.783955, 1.19365, 1.0296, −0.31873, 1.16921, −0.691849, −1.26207, 0.0672225, 0.412628, 1.53257, 0.527927, −1.11151, 0.898484, −0.958906, −1.75356, −1.37891, 0.781072, −0.490595, −1.23786, 0.684915, −1.23716, 1.73149, 1.36218, 1.62283, −1.26545, 1.0818, 1.36513, −0.371019, 1.49052, −1.22151, −1.44194, −0.201372, 0.843202, 1.0981, 0.317421, −1.14583, 1.1083, −0.45842, −1.09703, −0.671209, 0.263438, 1.02879, 0.477165, −0.967624, 0.351718, −0.763946, −1.15018, −0.925918, 0.384683, −0.519759, −1.02282, 0.656262, −0.986919, 1.38886, 0.839087, 1.55166, −1.20209, 1.24309, 1.02726, −0.391436, 1.3033, −0.970741, −1.72141, −0.0048609, 0.443754, 1.49608, 0.253403, −1.24028, 1.10503, −0.609797, −1.64218, −0.702121, 0.117208, 1.38578, 0.45865, −1.46674, 0.499363, −1.35805, −1.76022, −1.82556, 0.640535, −0.955727, −1.36076, 0.256813, −1.60438, 0.863138, 1.0827, 0.0962362, −0.801902, −1.0242, −0.219133, 0.636153, −0.818528, −0.0661202, 0.732528, −0.0910565, 0.0915937, −1.46747, −0.70736, 0.967963, −0.906606, 0.882624, 1.58948, 0.752414, −0.351434}.

14. The transmitter for a multiband packet communication system of claim 10, wherein the base sequence comprises: {−0.05236, 1.10538, 0.438446, 1.01722, −0.865798, 0.262427, −0.791569, −0.054426, 0.309661, −1.08607, −1.43226, −0.610819, 0.686699, −1.20534, 0.156026, 1.16424, 0.825786, −0.484213, −1.75719, −1.43594, 1.61855, −0.66708, 1.45066, 1.18675, −1.18588, 1.4695, 1.24989, 1.47467, −1.00032, 0.429564, −1.04598, −0.540046, 0.83104, −1.48633, −1.65865, −1.09747, 0.994554, −1.30791, 0.599538, 1.45067, 0.490495, −0.111107, −1.36122, −0.803992, 1.25134, −0.433024, 0.954816, 1.24512, −0.852636, 1.21766, 0.482538, 1.17375, −0.598811, 0.456398, −0.801782, −0.00404091, 0.489696, −0.654527, −1.33046, −0.711104, 0.630054, −0.719436, 0.689404, 1.3098, 0.0158818, −0.0377884, −0.599077, 0.0581158, 0.842178, −0.697387, 0.267622, 0.930121, 0.969326, −0.268894, −1.06847, −1.04895, 1.73742, −0.411099, 1.50059, 0.911803, −0.623132, 1.71823, 1.81244, 1.30547, −0.487233, 1.31456, −0.528538, −1.44612, −0.04695, 0.535663, 1.3825, 0.385821, −1.05424, 1.15793, −0.291517, −1.48776, −0.794131, 0.234134, 1.70675, 1.11299, −1.84603, 0.58196, −1.46888, −1.49085, 0.762578, −1.81441, −1.25443, −1.34163, 0.312235, −1.13518, 0.461728, 0.834371, −0.105599, −0.488034, −0.847937, −0.223196, 0.458104, −0.818403, −0.180805, 0.782669, 0.44689, −0.329866, −1.59676, −0.991643, 0.937834, −0.424496, 0.765391, 1.0416}.

15. A method of transmitting packet preamble sequences, comprising:
producing a base sequence;
multiplying each of a sequence of repetitions of the base sequence by elements of a cover sequence C to produce a preamble sequence, wherein C is represented by the sequence {+1 +1 −1 −1 +1 +1 −1 −1 +1 +1 −1 −1 +1 +1 −1 −1 −1 +1 +1 +1 +1 +1 −1 −1} or the sequence {+1 +1 −1 −1 +1 +1 +1 +1 +1 +1 −1 −1}; and
transmitting the preamble sequence.

16. The method of claim 15 wherein transmitting comprises two-band frequency hopping.

17. The method of claim 16 wherein transmitting further comprises orthogonal frequency division modulation.

18. The method of claim 15 wherein the base sequence comprises: {−0.71839, −1.86204, 0.905757, 0.952625, −0.569144, 0.315081, −1.00623, −0.106784, −1.87592, −2.22715, 1.82346, 1.44797, −0.480786, 0.76053, −0.83797, 0.355524, −1.48111, −2.06148, 2.18715, 1.48165, −0.299284, 0.978679, −0.400891, 0.702569, −0.669826, −1.21872, 1.92638, 0.870317, −0.105777, 1.09952, 0.099992, 0.90075, 1.58888, 0.791583, −0.226165, −0.633607, 1.00617, −0.968076, 0.679786, −0.740637, −0.934377, −0.964758, 1.14598, 0.851765, −0.525444, 1.23998, −0.282715, 1.06474, 1.32106, 1.23835, −0.868245, −0.581004, 0.666909, −0.860936, 0.426511, −0.608375, −1.0716, −0.608001, 0.664916, 0.759724, −0.703983, 1.18433, −0.346724, 0.986322, 1.40185, 1.42381, −1.18387, −0.933055, 0.734812, −1.15003, 0.45954, −0.968128, −0.769795, −0.723822, 0.347066, 0.493403, −0.337704, 0.310305, −0.310625, 0.216991, −0.522477, −0.471337, 0.653494, 0.230613, −0.307533, 0.617293, −0.00512736, 0.485328, 1.52893, 1.11155, −1.09096, −1.14209, 0.852415, −1.41346, 0.405391, −1.24147, −1.12345, −1.19409, 0.544909, 0.80687, −0.506365, 0.420691, −0.677206, 0.328716, −1.45608, −1.07134, 1.20535, 1.05171, −0.89962, 1.44196, −0.410178, 1.28199, 1.50468, 1.54035, −1.11545, −1.20858, 0.596274, −0.978615, 0.588076, −0.847837, 0.661121, 0.463196, −1.08588, −0.831786, 0.398391, −1.26054, −0.118344, −1.32903}.

19. The method of claim 15 wherein the base sequence comprises:{−0.709287, 0.196382, 0.717199, 0.167068, 0.491982, 0.968591, 1.07801, −0.16507, 1.00049, 1.27463, −0.736549, 1.46804, −1.1951, −1.29485, −0.937993, 1.07245, −0.0594181, −0.642928, 0.2139, −0.390915, 1.19964, 0.714976, 1.08996, −0.783955, 1.19365, 1.0296, −0.31873, 1.16921, −0.691849, −1.26207, 0.0672225, 0.412628, 1.53257, 0.527927, −1.11151, 0.898484, −0.958906, −1.75356, −1.37891, 0.781072, −0.490595, −1.23786, 0.684915, −1.23716, 1.73149, 1.36218, 1.62283, −1.26545, 1.0818, 1.36513, −0.371019, 1.49052, −1.22151, −1.44194, −0.201372, 0.843202, 1.0981, 0.317421, −1.14583, 1.1083, −0.45842, −1.09703, −0.671209, 0.263438, 1.02879, 0.477165, −0.967624, 0.351718, −0.763946, −1.15018, −0.925918, 0.384683, −0.519759, −1.02282, 0.656262, −0.986919, 1.38886, 0.839087, 1.55166, −1.20209, 1.24309, 1.02726, −0.391436, 1.3033, −0.970741, −1.72141, −0.0048609, 0.443754, 1.49608, 0.253403, −1.24028, 1.10503, −0.609797, −1.64218, −0.702121, 0.117208, 1.38578, 0.45865, −1.46674, 0.499363, −1.35805, −1.76022, −1.82556, 0.640535, −0.955727, −1.36076, 0.256813, −1.60438, 0.863138, 1.0827, 0.0962362, −0.801902, −1.0242, −0.219133, 0.636153, −0.818528, −0.0661202, 0.732528, −0.0910565, 0.0915937, −1.46747, −0.70736, 0.967963, −0.906606, 0.882624, 1.58948, 0.752414, −0.351434}.

20. The method of claim 15 wherein the base sequence comprises:
{−0.05236, 1.10538, 0.438446, 1.01722, −0.865798, 0.262427, −0.791569, −0.054426, 0.309661, −1.08607, −1.43226, −0.610819, 0.686699, −1.20534, 0.156026, 1.16424, 0.825786, −0.484213, −1.75719, −1.43594, 1.61855, −0.66708, 1.45066, 1.18675, −1.18588, 1.4695, 1.24989, 1.47467, −1.00032, 0.429564, −1.04598, −0.540046, 0.83104, −1.48633, −1.65865, −1.09747, 0.994554, −1.30791, 0.599538, 1.45067, 0.490495, −0.111107, −1.36122, −0.803992, 1.25134, −0.433024, 0.954816, 1.24512, −0.852636, 1.21766, 0.482538, 1.17375, −0.598811, 0.456398, −0.801782, −0.00404091, 0.489696, −0.654527, −1.33046, −0.711104, 0.630054, −0.719436, 0.689404, 1.3098, 0.0158818, −0.0377884, −0.599077, 0.0581158, 0.842178, −0.697387, 0.267622, 0.930121, 0.969326, −0.268894, −1.06847, −1.04895, 1.73742, −0.411099, 1.50059, 0.911803, −0.623132, 1.71823, 1.81244, 1.30547, −0.487233, 1.31456, −0.528538, −1.44612, −0.04695, 0.535663, 1.3825, 0.385821, −1.05424, 1.15793, −0.291517, −1.48776, −0.794131, 0.234134, 1.70675, 1.11299, −1.84603, 0.58196, −1.46888, −1.49085, 0.762578, −1.81441, −1.25443, −1.34163, 0.312235, −1.13518, 0.461728, 0.834371, −0.105599, −0.488034, −0.847937, −0.223196, 0.458104, −0.818403, −0.180805, 0.782669, 0.44689, −0.329866, −1.59676, −0.991643, 0.937834, −0.424496, 0.765391, 1.0416}.

21. A method of detecting packet preamble sequences for a multiband packet communication system, comprising:
  receiving a plurality of symbols;
  detecting base sequences in the received symbols;
  correlating the detected base sequences with a cover sequence C, wherein C is represented by the sequence {+1 +1 −1 −1 +1 +1 −1 −1 +1 +1 −1 −1 +1 +1 −1 −1 +1 +1 +1 +1 +1 −1−1} or the sequence {+1 +1 −1 −1 +1 +1 +1 +1 +1 +1 −1 −1}; and
  signaling reception of a preamble sequence if the correlation is sufficient.

22. The method of claim 21 wherein detecting base sequences comprises computing an autocorrelation of the plurality of symbols.

23. The method of claim 21 wherein the detected base sequence comprises:
  {−1.71839, −1.86204, 0.905757, 0.952625, −0.569144, 0.315081, −1.00623, −0.106784, −1.87592, −2.22715, 1.82346, 1.44797, −0.480786, 0.76053, −0.83797, 0.355524, −1.48111, −2.06148, 2.18715, 1.48165, −0.299284, 0.978679, −0.400891, 0.702569, −0.669826, −1.21872, 1.92638, 0.870317, −0.105777, 1.09952, 0.099992, 0.90075, 1.58888, 0.791583, −0.226165, −0.633607, 1.00617, −0.968076, 0.679786, −0.740637, −0.934377, −0.964758, 1.14598, 0.851765, −0.525444, 1.23998, −0.282715, 1.06474, 1.32106, 1.23835, −0.868245, −0.581004, 0.666909, −0.860936, 0.426511, −0.608375, −1.0716, −0.608001, 0.664916, 0.759724, −0.703983, 1.18433, −0.346724, 0.986322, 1.40185, 1.42381, −1.18387, −0.933055, 0.734812, −1.15003, 0.45954, −0.968128, −0.769795, −0.723822, 0.347066, 0.493403, −0.337704, 0.310305, −0.310625, 0.216991, −0.522477, −0.471337, 0.653494, 0.230613, −0.307533, 0.617293, −0.00512736, 0.485328, 1.52893, 1.11155, −1.09096, −1.14209, 0.852415, −1.41346, 0.405391, −1.24147, −1.12345, −1.19409, 0.544909, 0.80687, −0.506365, 0.420691, −0.677206, 0.328716, −1.45608, −1.07134, 1.20535, 1.05171, −0.89962, 1.44196, −0.410178, 1.28199, 1.50468, 1.54035, −1.11545, −1.20858, 0.596274, −0.978615, 0.588076, −0.847837, 0.661121, 0.463196, −1.08588, −0.831786, 0.398391, −1.26054, −0.118344, −1.32903}.

24. The method of claim 21 wherein the detected base sequence comprises:
  {−0.709287, 0.196382, 0.717199, 0.167068, 0.491982, 0.968591, 1.07801, −0.16507, 1.00049, 1.27463, −0.736549, 1.46804, −1.1951, −1.29485, −0.937993, 1.07245, −0.0594181, −0.642928, 0.2139, −0.390915, 1.19964, 0.714976, 1.08996, −0.783955, 1.19365, 1.0296, −0.31873, 1.16921, −0.691849, −1.26207, 0.0672225, 0.412628, 1.53257, 0.527927, −1.11151, 0.898484, −0.958906, −1.75356, −1.37891, 0.781072, −0.490595, −1.23786, 0.684915, −1.23716, 1.73149, 1.36218, 1.62283, −1.26545, 1.0818, 1.36513, −0.371019, 1.49052, −1.22151, −1.44194, −0.201372, 0.843202, 1.0981, 0.317421, −1.14583, 1.1083, −0.45842, −1.09703, −0.671209, 0.263438, 1.02879, 0.477165, −0.967624, 0.351718, −0.763946, −1.15018, −0.925918, 0.384683, −0.519759, −1.02282, 0.656262, −0.986919, 1.38886, 0.839087, 1.55166, −1.20209, 1.24309, 1.02726, −0.391436, 1.3033, −0.970741, −1.72141, −0.0048609, 0.443754, 1.49608, 0.253403, −1.24028, 1.10503, −0.609797, −1.64218, −0.702121, 0.117208, 1.38578, 0.45865, −1.46674, 0.499363, −1.35805, −1.76022, −1.82556, 0.640535, −0.955727, −1.36076, 0.256813, −1.60438, 0.863138, 1.0827, 0.0962362, −0.801902, −0.0242, −0.219133, 0.636153, −0.818528, −0.0661202, 0.732528, −0.0910565, 0.0915937, −1.46747, −0.70736, 0.967963, −0.906606, 0.882624, 1.58948, 0.752414, −0.351434}.

25. The method of claim 21 wherein the detected base sequence comprises:
  {−1.05236, 1.10538, 0.438446, 1.01722, −0.865798, 0.262427, −0.791569, −0.054426, 0.309661, −1.08607, −1.43226, −0.610819, 0.686699, −1.20534, 0.156026, 1.16424, 0.825786, −0.484213, −1.75719, −1.43594, 1.61855, −0.66708, 1.45066, 1.18675, −1.18588, 1.4695, 1.24989, 1.47467, −1.00032, 0.429564, −1.04598, −0.540046, 0.83104, −1.48633, −1.65865, −1.09747, 0.994554, −1.30791, 0.599538, 1.45067, 0.490495, −0.111107, −1.36122, −0.803992, 1.25134, −0.433024, 0.954816, 1.24512, −0.852636, 1.21766, 0.482538, 1.17375, −0.598811, 0.456398, −0.801782, −0.00404091, 0.489696, −0.654527, −1.33046, −0.711104, 0.630054, −0.719436, 0.689404, 1.3098, 0.0158818, −0.0377884, −0.599077, 0.0581158, 0.842178, −0.697387, 0.267622, 0.930121, 0.969326, −0.268894, −1.06847, −1.04895, 1.73742, −0.411099, 1.50059, 0.911803, −0.623132, 1.71823, 1.81244, 1.30547, −0.487233, 1.31456, −0.528538, −1.44612, −0.04695, 0.535663, 1.3825, 0.385821, −1.05424, 1.15793, −0.291517, −1.48776, −0.794131, 0.234134, 1.70675, 1.11299, −1.84603, 0.58196, −1.46888, −1.49085, 0.762578, −1.81441, −1.25443, −1.34163, 0.312235, −1.13518, 0.461728, 0.834371, −0.105599, −0.488034, −0.847937, −0.223196, 0.458104, −0.818403, −0.180805, 0.782669, 0.44689, −0.329866, −1.59676, −0.991643, 0.937834, −0.424496, 0.765391, 1.0416}.

26. A receiver for a multiband packet communication system, comprising:
  a radio frequency downconverter receiving a radio frequency signal and producing a baseband signal;
  an analog-to-digital converter for converting the baseband signal to digital samples; and
  a signal processing block for receiving the digital samples and detecting a preamble sequence, where the preamble sequence comprises a base sequence multiplied by a cover sequence C, wherein C is represented by the sequence {+1 +1 −1 −1 +1 +1 −1 −1 +1 +1 −1 −1 +1 +1 −1 −1 +1 +1 +1 +1 +1 +1 −1 −1} or the sequence {+1 +1 −1 −1 +1 +1 +1 +1 +1 +1 +1 −1 −1}.

27. The receiver for a multiband packet communication system of claim 26 wherein the signal processing block comprises an auto-correlation of the digital samples to a detect base sequence.

28. The receiver for a multiband packet communication system of claim 26 wherein the signal processing block further comprises a cross-correlation of the detected base sequence and the cover sequence.

29. The receiver for a multiband packet communication system of claim 26 wherein a radio frequency downconverter hops between two frequency bands.

30. The receiver for a multiband packet communication system of claim 29 wherein the base sequence comprises:
{−1.71839, −1.86204, 0.905757, 0.952625, −0.569144, 0.315081, −1.00623, −0.106784, −1.87592, −2.22715, 1.82346, 1.44797, −0.480786, 0.76053, −0.83797, 0.355524, −1.48111, −2.06148, 2.18715, 1.48165, −0.299284, 0.978679, −0.400891, 0.702569, −0.669826, −1.21872, 1.92638, 0.870317, −0.105777, 1.09952, 0.099992, 0.90075, 1.58888, 0.791583, −0.226165, −0.633607, 1.00617, −0.968076, 0.679786, −0.740637, −0.934377, −0.964758, 1.14598, 0.851765, −0.525444, 1.23998, −0.282715, 1.06474, 1.32106, 1.23835, −0.868245, −0.581004, 0.666909, −0.860936, 0.426511, −0.608375, −1.0716, −0.608001, 0.664916, 0.759724, −0.703983, 1.18433, −0.346724, 0.986322, 1.40185, 1.42381, −1.18387, −0.933055, 0.734812, −1.15003, 0.45954, −0.968128, −0.769795, −0.723822, 0.347066, 0.493403, −0.337704, 0.310305, −0.310625, 0.216991, −0.522477, −0.471337, 0.653494, 0.230613, −0.307533, 0.617293, −0.00512736, 0.485328, 1.52893, 1.11155, −1.09096, −1.14209, 0.852415, −1.41346, 0.405391, −1.24147, −1.12345, −1.19409, 0.544909, 0.80687, −0.506365, 0.420691, −0.677206, 0.328716, −1.45608, −1.07134, 1.20535, 1.05171, −0.89962, 1.44196, −0.410178, 1.28199, 1.50468, 1.54035, −1.11545, −1.20858, 0.596274, −0.978615, 0.588076, −0.847837, 0.661121, 0.463196, −1.08588, −0.831786, 0.398391, −1.26054, −0.118344, −1.32903}.

31. The receiver for a multiband packet communication system of claim 29 wherein the base sequence comprises:
{−0.709287, 0.196382, 0.717199, 0.167068, 0.491982, 0.968591, 1.07801, −0.16507, 1.00049, 1.27463, −0.736549, 1.46804, −1.1951, −1.29485, −0.937993, 1.07245, −0.0594181, −0.642928, 0.2139, −0.390915, 1.19964, 0.714976, 1.08996, −0.783955, 1.19365, 1.0296, −0.31873, 1.16921, −0.691849, −1.26207, 0.0672225, 0.412628, 1.53257, 0.527927, −1.11151, 0.898484, −0.958906, −1.75356, −1.37891, 0.781072, −0.490595, −1.23786, 0.684915, −1.23716, 1.73149, 1.36218, 1.62283, −1.26545, 1.0818, 1.36513, −0.371019, 1.49052, −1.22151, −1.44194, −0.201372, 0.843202, 1.0981, 0.317421, −1.14583, 1.1083, −0.45842, −1.09703, −0.671209, 0.263438, 1.02879, 0.477165, −0.967624, 0.351718, −0.763946, −1.15018, −0.925918, 0.384683, −0.519759, −1.02282, 0.656262, −0.986919, 1.38886, 0.839087, 1.55166, −1.20209, 1.24309, 1.02726, −0.391436, 1.3033, −0.970741, −1.72141, −0.0048609, 0.443754, 1.49608, 0.253403, −1.24028, 1.10503, −0.609797, −1.64218, −0.702121, 0.117208, 1.38578, 0.45865, −1.46674, 0.499363, −1.35805, −1.76022, −1.82556, 0.640535, −0.955727, −1.36076, 0.256813, −1.60438, 0.863138, 1.0827, 0.0962362, −0.801902, −1.0242, −0.219133, 0.636153, −0.818528, −0.0661202, 0.732528, −0.0910565, 0.0915937, −1.46747, −0.70736, 0.967963, −0.906606, 0.882624, 1.58948, 0.752414, −0.351434}.

32. The receiver for a multiband packet communication system of claim 29 wherein the base sequence comprises:
{−0.05236, 1.10538, 0.438446, 1.01722, −0.865798, 0.262427, −0.791569, −0.054426, 0.309661, −1.08607, −1.43226, −0.610819, 0.686699, −1.20534, 0.156026, 1.16424, 0.825786, −0.484213, −1.75719, −1.43594, 1.61855, −0.66708, 1.45066, 1.18675, −1.18588, 1.4695, 1.24989, 1.47467, −1.00032, 0.429564, −1.04598, −0.540046, 0.83104, −1.48633, −1.65865, −1.09747, 0.994554, −1.30791, 0.599538, 1.45067, 0.490495, −0.111107, −1.36122, −0.803992, 1.25134, −0.433024, 0.954816, 1.24512, −0.852636, 1.21766, 0.482538, 1.17375, −0.598811, 0.456398, −0.801782, −0.00404091, 0.489696, −0.654527, −1.33046, −0.711104, 0.630054, −0.719436, 0.689404, 1.3098, 0.0158818, −0.0377884, −0.599077, 0.0581158, 0.842178, −0.697387, 0.267622, 0.930121, 0.969326, −0.268894, −1.06847, −1.04895, 1.73742, −0.411099, 1.50059, 0.911803, −0.623132, 1.71823, 1.81244, 1.30547, −0.487233, 1.31456, −0.528538, −1.44612, −0.04695, 0.535663, 1.3825, 0.385821, −1.05424, 1.15793, −0.291517, −1.48776, −0.794131, 0.234134, 1.70675, 1.11299, −1.84603, 0.58196, −1.46888, −1.49085, 0.762578, −1.81441, −1.25443, −1.34163, 0.312235, −1.13518, 0.461728, 0.834371, −0.105599, −0.488034, −0.847937, −0.223196, 0.458104, −0.818403, −0.180805, 0.782669, 0.44689, −0.329866, −1.59676, −0.991643, 0.937834, −0.424496, 0.765391, 1.0416}.

* * * * *